United States Patent
Yamin et al.

(10) Patent No.: US 10,909,710 B2
(45) Date of Patent: Feb. 2, 2021

(54) SYSTEM AND METHOD FOR TRACKING PRODUCT STOCK IN A STORE SHELF

(71) Applicant: Akcelita, LLC, San Juan, PR (US)

(72) Inventors: Rene Yamin, San Juan, PR (US); Rafael Esparra, San Juan, PR (US); Giovany Vega, San Juan, PR (US)

(*) Notice: Subject to any disclaimer, the term of this patent is extended or adjusted under 35 U.S.C. 154(b) by 0 days.

(21) Appl. No.: 16/842,621

(22) Filed: Apr. 7, 2020

(65) Prior Publication Data

US 2020/0242795 A1 Jul. 30, 2020

Related U.S. Application Data (63) Continuation-in-part of application No. 16/520,102, filed on Jul. 23, 2019, now Pat. No. 10,614,578, which is a continuation-in-part of application No. 16/100,396, filed on Aug. 10, 2018, now Pat. No. 10,360,445, which is a continuation-in-part of application No. 15/441,736, filed on Feb. 24, 2017, now Pat. No. 10,049,462.

(60) Provisional application No. 62/312,251, filed on Mar. 23, 2016.

(51) Int. Cl.
*G06T 7/62* (2017.01)
*G06T 7/50* (2017.01)
*G06Q 10/08* (2012.01)

(52) U.S. Cl.
CPC ............ *G06T 7/62* (2017.01); *G06Q 10/087* (2013.01); *G06T 7/50* (2017.01); *G06T 2207/10028* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 10,147,210 B1* | 12/2018 | Desai | G06T 11/60 |
| 10,565,548 B2* | 2/2020 | Skaff | G06K 9/3216 |
| 10,769,582 B2* | 9/2020 | Williams | G06K 9/3233 |
| 2015/0110355 A1* | 4/2015 | Dill | G06K 9/00362 |
| | | | 382/103 |
| 2017/0286901 A1* | 10/2017 | Skaff | G05D 1/0246 |
| 2018/0005176 A1* | 1/2018 | Williams | G06Q 10/08 |
| 2018/0101813 A1* | 4/2018 | Paat | H04N 7/185 |
| 2019/0034864 A1* | 1/2019 | Skaff | G06K 7/1413 |
| 2019/0180150 A1* | 6/2019 | Taylor | G06T 3/0062 |
| 2019/0333237 A1* | 10/2019 | Javidnia | G06K 9/6215 |

* cited by examiner

*Primary Examiner* — Anand P Bhatnagar
(74) *Attorney, Agent, or Firm* — Eugenio J. Torres-Oyola; Victor M. Rodriguez-Reyes; Ferraiuoli LLC (57) ABSTRACT

A system and method for tracking and annotating products in a store shelf is disclosed. The method includes receiving a signal feed from a group of sensors including at least one depth sensor, determining an area of interest in the shelf, determining a polygonal representation of at least one product present in the area of interest, and assigning a unique polygonal profile to at least one product, and/or storing the unique profile in a database. Such The unique polygonal profile may include a unique ID obtained from a group of attributes. The unique profile may include at least a unique position and a unique centroid. The group of sensors may further include video cameras, thermal, and chemical sensors.

20 Claims, 8 Drawing Sheets

| | 900 |
|---|---|
| RECEIVING SIGNAL FEED FROM PLURALITY OF SENSORS | 902 |
| IDENTIFYING PROI IN THE SHELF | 904 |
| ASSIGN UNIQUE POLYGONAL PROFILE TO AT LEAST ONE PRODUCT | 906 |
| STORE UNIQUE POLYGONAL PROFILE IN DATABASE | 908 |
| PROFILE ATTRIBUTES UPDATED BASED ON DEPTH OF PROI | 910 |
| DONE | 912 |

| RECEIVING SIGNAL FEED FROM PLURALITY OF SENSORS | 702 |
| --- | --- |
| DETERMINING REFERENCE SIGNAL FEED FROM SIGNAL FEED | 704 |
| DETERMINE VOLUMETRIC REPRESENTATION OF AT LEAST ONE PERSON, ANIMAL OR OBJECT NOT PRESENT IN REFERENCE SIGNAL FEED | 706 |
| DETERMINE, USING ARTIFICAL INTELLIGENCE, IF THE VOLUMETRIC REPRESENTATION BELONGS TO A PERSON, ANIMAL OR AN OBJECT | 706a |
| ASSIGN UNIQUE VOLUMETRIC PROFILE TO AT LEAST ONE PERSON, ANIMAL OR OBJECT | 708 |
| STORE UNIQUE VOLUMETRIC PROFILE IN DATABASE | 710 |
| UNIQUE VOLUMETRIC ID OBTAINED FROM PLURALITY OF VOLUMETRIC ATTRIBUTES | 712 |
| DONE | 714 |

FIG. 7

| RECEIVE SIGNAL FEED FROM VOLUMETRIC SENSOR | 802 |
| --- | --- |
| CALCULATE REFERENCE SIGNAL FEED FROM SIGNAL FEED | 804 |
| DETERMINE OPTIMAL SIGNAL SPACE FOR DETECTING PERSONS, ANIMALS OR OBJECTS | 806 |
| DETECT PRESENCE OF PERSON, ANIMAL OR OBJECT IN SIGNAL FEED (OPTIONALLY USING ARTIFICIAL INTELLIGENCE) | 808 |
| ASSIGN UNIQUE VOLUMETRIC PROFILE TO PERSON, ANIMAL OR OBJECT | 810 |
| UNIQUE VOLUMETRIC PROFILE | 812 |
| STORE UNIQUE VOLUMETRIC PROFILE IN PERSON, ANIMAL OR OBJECT DATABASE | 814 |
| RETRIEVE UNIQUE VOLUMETRIC PROFILE FROM DATABASE | 816 |
| DONE | 818 |

SYSTEM AND METHOD FOR TRACKING PRODUCT STOCK IN A STORE SHELF

PRIORITY

This application claims priority from U.S. patent application Ser. No. 16/100,396, filed on Aug. 10, 2018, which claims priority from U.S. patent application Ser. No. 15/441,736, filed on Feb. 24, 2017, which claims priority from U.S. Provisional Application 62/312,251, filed on Mar. 23, 2016.

BACKGROUND

Current object tracking mechanisms are costly, inaccurate, and/or computationally expensive and fail to provide means for annotation of information related to the moving object.

For example, U.S. Pat. No. 7,688,349 is directed towards a system that can track individuals to determine whether the individuals belong to the same group. However, the '349 patent discloses the use of video cameras and does not provide a unique identification (id) for each individual in the group.

Similarly, U.S. Pat. No. 8,630,460 is directed towards a system and method useful for augmenting a 2D image into a 3D representation. This system, like most similar systems, utilizes video cameras to capture the environment and does not provide means for annotating the detected objects with metadata as provided herein.

Along the same lines, U.S. Pat. No. 7,327,362 provides a method for providing volumetric representations of three-dimensional objects. However, this method requires assigning foreground and background voxels to a silhouette, a feature that is not required in this disclosure.

Using a depth sensor, determining the contour and volumetric representation of an object, and annotating said volumetric representation with additional data including, but not limited to, data obtained from additional sensors, such as microphones or video cameras, data from pre-trained Convoluted Neural Networks (CNN), and/or new data developed from the data provided from those sensors, overcomes the challenges over the prior art and affords an inexpensive solution to track and annotate moving objects. The present disclosure overcomes one or more of the problems found in the prior art.

BRIEF SUMMARY

In this disclosure, a volumetric sensor is a sensor from which a volumetric representation of an object may be reasonably calculated in real-time. Examples of a volumetric sensor include time-of-flight sensors from which depth can be calculated (i.e. depth sensors) and/or thermal sensors. Video cameras are generally not useful to accurately calculate a volumetric representation of an object but video cameras may be used in conjunction with a volumetric sensor to determine related physical attributes that can be annotated as metadata such as color. Other sensors, such as microphones, thermal, and chemical may also be used to annotate the unique volumetric profile with metadata. For example, the metadata can include chemical information detected using chemical sensors with application in marketing or security surveillance.

In some embodiments, the method may include receiving a signal feed from a group of sensors including at least one depth sensor, determining a reference signal feed from the signal feed, determining a volumetric representation of at least one object not present in the reference signal feed, assigning a unique volumetric profile to at least one object, and/or storing the unique volumetric profile in an object database. The signal feed may include at least one 3D area or region of interest. Also, the unique volumetric profile may include a unique volumetric ID obtained from a group of volumetric attributes. In some embodiments, the unique volumetric profile may include at least a unique volumetric position and a unique volumetric centroid. The group of sensors may further include at least one video sensor.

In some embodiments, the method includes receiving a signal feed from a volumetric sensor; calculating a reference signal feed from the signal feed; defining an entry point, a exit point and a path for a region of interest in the reference signal feed; detecting the presence of an object, person or animal in the signal feed; assigning a unique volumetric profile to the object; annotating the unique volumetric profile with metadata obtained from the volumetric sensor, as well as other sensors; storing the unique volumetric profile in an object database; and/or retrieving the unique volumetric profile from the object database. The annotated unique volumetric profile may additionally include metadata such as a unique volumetric ID and a unique volumetric position in the queue path. In some embodiments, the unique volumetric position in the queue path is determined with respect to the queue entry point and the queue exit point.

In some embodiments, the method includes receiving a signal feed from a volumetric sensor; calculating a reference signal feed from the signal feed; determining a region of interest for detecting people, objects or animals; detecting the presence of a person, object or animal in the signal feed; assigning a unique volumetric profile to the person; the unique volumetric profile; storing the unique volumetric profile in a database; and/or retrieving the unique volumetric profile from the database. The unique volumetric profile may additionally include a unique volumetric ID and a unique volumetric position.

In some embodiments, the method may include receiving a signal feed from a group of sensors including at least one depth sensor, determining a reference signal feed from the signal feed, determining a volumetric representation of at least one person, object or animal not present in the reference signal feed, assigning a unique volumetric profile to the at least one person, object or animal, and/or storing the unique volumetric profile in a database. The signal feed may include at least one area of interest. Also, the unique volumetric profile may include a unique volumetric ID obtained from a group of volumetric attributes. In some embodiments, the unique volumetric profile may include at least a unique volumetric position and a unique volumetric centroid. The group of sensors may further include at least one video sensor.

In some embodiments, the method may include receiving a signal feed from a group of sensors including at least one depth sensor, determining a polygonal representation of at least one object based on a region of interest, assigning a unique polygonal profile to the at least one object, and/or storing the unique polygonal profile in a database. Also, the unique polygonal profile may include a unique polygonal ID obtained from a group of polygonal attributes. In some embodiments, the unique polygonal profile may include at least a unique polygonal position and a unique polygonal centroid. The group of sensors may further include at least one video sensor.

In some embodiments, the method may include using a pre-trained CNN to determine if a volumetric profile corresponds to a person, an animal or an object.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
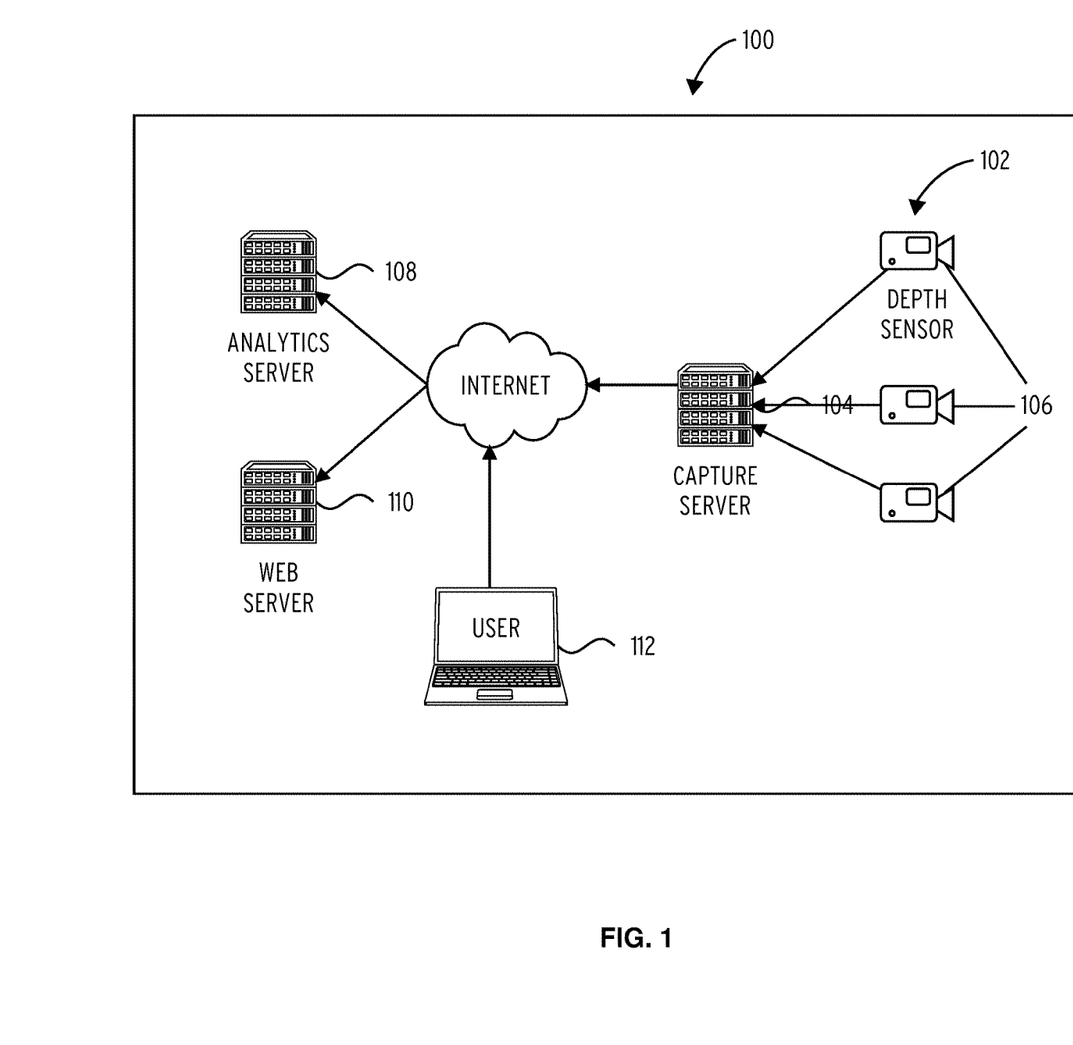
FIG. 1 illustrates an exemplary infrastructure for the object tracking system.

According to FIG. 1, tracking system 100 includes a capture server 104 operationally connected to a plurality of sensors 106 in a physical site. The plurality of sensors 106 includes at least one depth sensor 102. The plurality of sensors 106 may include any suitable type of sensor such as a video camera, a microphone, or other sensors. The data captured by the capture server 104 is filtered and processed to obtain a volumetric representation of a moving object, person or animal captured by the plurality of sensors 106. These volumetric representations are further processed to obtain a unique volumetric ID and a unique volumetric profile for each moving object. The unique volumetric profile may include metadata such as the unique volumetric centroid and the unique volumetric position of the moving object. Capture server 104 further comprises a trained CNN model, which allows the system to detect volumetric profiles for people, animals or objects. For example, the CNN allows the system to identify a volumetric profile as belonging to a dog and another as belonging to a chair.

After processing the captured data, the capture server 104 generates and sends data packet to the analytics server 108. As discussed, said data packet contains metadata information about the moving objects, people or animals captured by the plurality of sensors 106. Communication between the capture server 104 and the analytics server 108 may be initiated in any suitable fashion such as a remote procedure call or an API. In some embodiments, the communication is performed in JSON, YAML, XML, or any similar format. In some embodiments, communication is performed by way of database or storage replication.

The analytics server 108 further processes the data from the capture server 104. For instance, the analytics server 108 may aggregate data from a plurality of capture servers. According to some embodiments, the analytics server 108 applies techniques to determine aggregated information from a plurality of physical sites or regions of interest. After analytics server 108 processes the data, it places the result in a format suitable for display in a web server 110. The web server 110 provides access to a user 112 to the processed data in analytics server 108.

The capture server 104, analytics server 108 and web server 110 each include at least one processor, RAM memory, storage medium, and a connection to the Internet.

Figure 2:
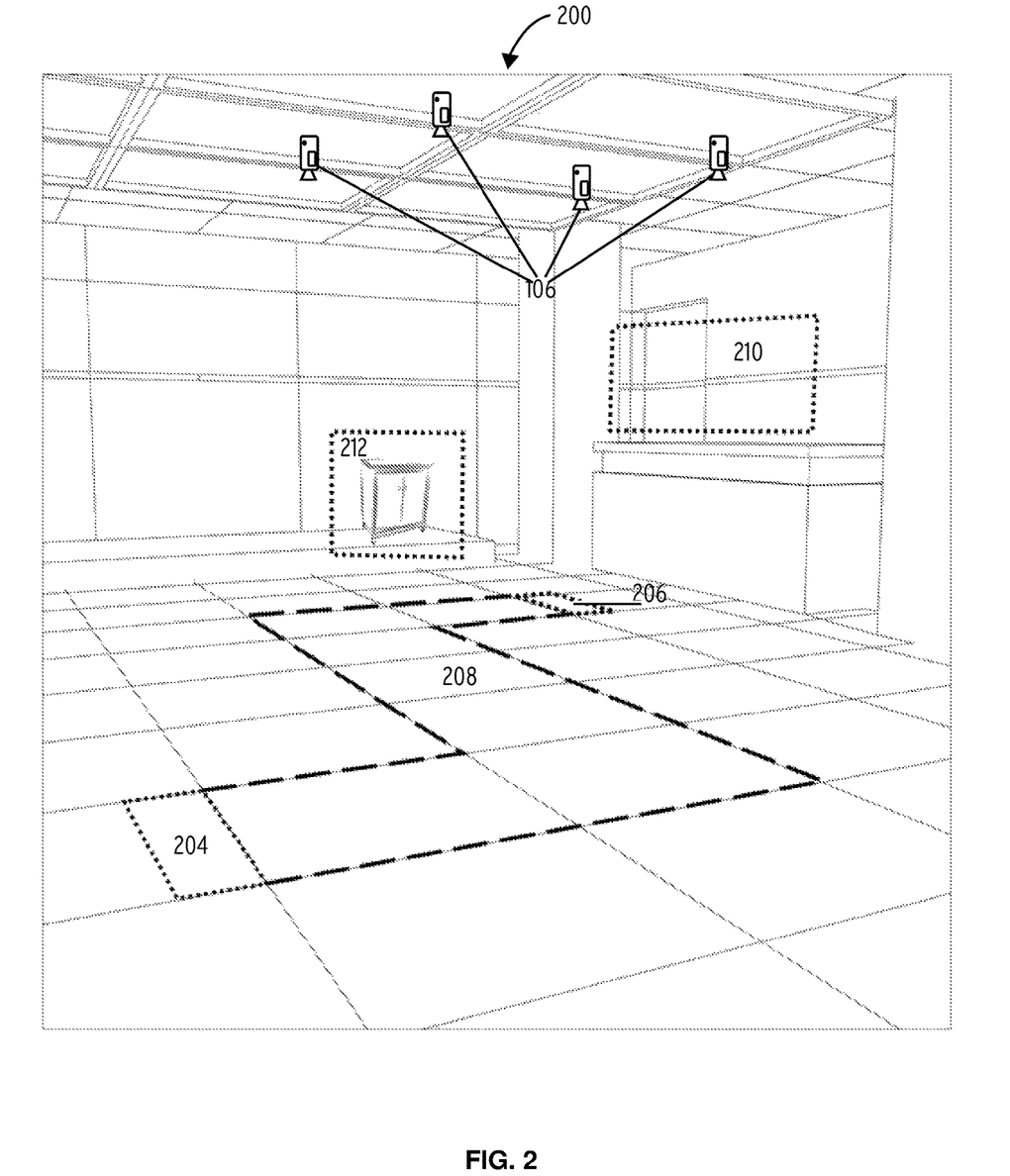
FIG. 2 illustrates a site managed by the tracking system.

FIG. 2 shows an exemplary site tracked by a plurality of sensors 106, including at least one depth sensor 102. In one embodiment, the reference signal feed includes an entry point 204, an exit point 206, and a path 208 for a region of interest.

Entry point 204 marks the place where the users enter the region of interest. In most sites, this marker is placed visibly with signs. Similarly, path 208 is the path that objects, people or animals follow to get to exit point 206 of the region of interest. In most sites, the path 208 will also be marked visibly with crowd control products such as retractable belt barriers. Once a customer representative or a self-service machine is available, the customer goes through exit point 206 and approaches customer service area 210. The plurality of sensors 106 may also track the interaction of customers with watched object 212, for example, for marketing or security measures.

The tracking system 100 allows site managers to measure, for example, the number of customers in a queue, the time they spent waiting in queue, and/or the productivity of employees or the efficiency of a self-service machine at customer service area 210. Further examples would be tracking the activity of animals in a zoo or the amount of stock or a merchandise item in a warehouse.

As shown in the picture, the plurality of sensors 106 may be mounted on the ceiling. However, it will be apparent to a person skilled in the art that the sensors may be wall-mounted, attached to furniture, or installed in other ways known by persons skilled in the art.

Figure 3:
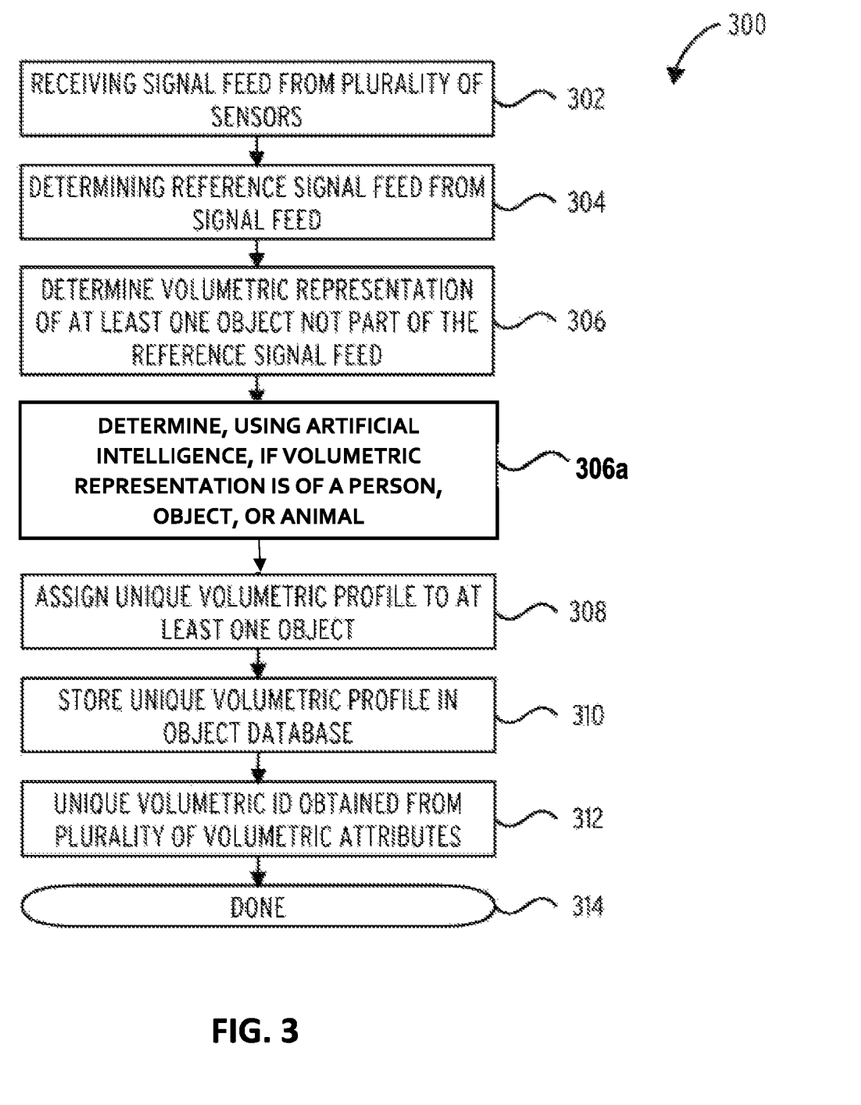
FIG. 3 illustrates a routine for obtaining a unique volumetric profile of an object in a reference signal feed in accordance with one embodiment.

Referring to FIG. 3, in block 302, routine 300 receiving a signal feed from a plurality of sensors. The plurality of sensors include at least one depth sensor 102. Other types of sensors, such as thermal sensors and video cameras, may be suitable for obtaining and annotating volumetric representations of objects.

In block 304, routine 300 determines a reference signal feed from the signal feed. The reference signal feed is obtained by detecting non-movable objects in the signal feed. Other filters may also be applied, such as ignoring all objects outside (above or below) of a height or temperature threshold. This may be useful, for example, to ignore objects such as plants, crowd control devices, lamps, and other undesired objects.

In block 306, routine 300 determines a volumetric representation of at least one object, person or animal not part of the reference signal feed. When the object, person or animal is detected, the contour of said object, person or animal is obtained. According to one embodiment, the contour is then placed inside of a rectangle in order to use less computing resources when following said object, person or animal.

In block 306a, a pre-trained CNN detects the object of interest present in the volumetric representation (person, object, or animal) and assigns a unique ID.

In block 308, routine 300 assigns a unique volumetric profile to the at least one object, person or animal. The unique volumetric profile contains all metadata obtained from the object, person or animal. In one embodiment, the unique volumetric profile contains metadata from a plurality of sensors, such as video cameras, thermal sensors, microphones, and others. In some embodiments, the unique volumetric profile includes at least a unique volumetric ID and a unique volumetric centroid.

In block 310, routine 300 stores the unique volumetric profile in a database. The database may be any kind of suitable storage such as a structured database, a column-based database or a text file in a format such as JSON or YAML. This may be needed, for example, to compare the unique volumetric profile with a new object, person or animal detected in the reference signal feed.

In block 312, routine 300 obtains a unique volumetric ID from a plurality of volumetric attributes. Assigning a unique volumetric ID may be performed by finding unique features of an object, person or animal based on its metadata and additional indirect calculations, such as its total volume, height, position, weight, color, acceleration, line of sight, and others. In one embodiment, these unique features are simply based on the location of the object, person or animal. In other embodiments, statistical and machine learning techniques may be used to train the system and later identify a volumetric representation once it reappears on screen after leaving the reference signal feed. These techniques help avoiding duplicate entries for the same object, person or animal. In "DONE" block 314, routine 300 ends.

Figure 4:
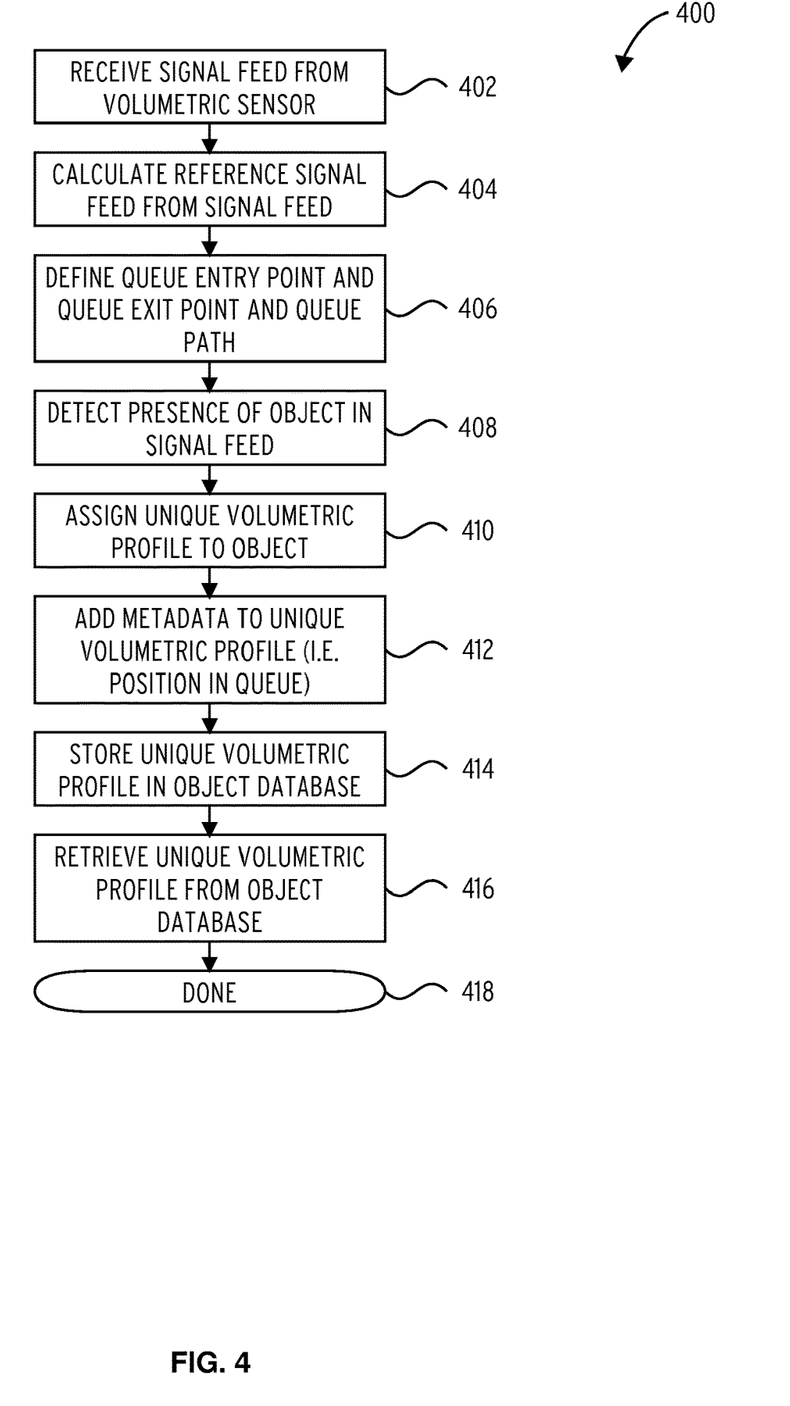
FIG. 4 illustrates a routine for managing a queue in a reference signal feed in accordance with one embodiment.

FIG. 4 shows an example embodiment of a queue tracking system. Such an embodiment is useful, for example, to determine how many customers are in a queue (region of interest) and how much time are they waiting to be served.

In block 402, routine 400 receives a signal feed from a volumetric sensor.

In block 404, routine 400 calculates a reference signal feed from the signal feed. As in FIG. 3, the reference signal feed is obtained by detecting non-movable objects in the signal feed. Other filters may also be applied, such as ignoring all objects outside (above or below) of a height or temperature threshold.

In block 406, routine 400 defines a queue entry point and a queue exit point and a queue path. The queue entry point is the section where customers enter the queue and the queue exit point is the section where customers exit the queue. The queue path may be optionally established to detect whether a person has left the queue even though it may still be visible in the reference signal feed or if any other object or animal is in the queue.

In block 408, routine 400 detects the presence of an object, person or animal in the signal feed. When an object, person or animal is detected, the routine 400 detects the its contour and calculates the volumetric representation from said contour and assigns an entry time timestamp. In block 410, routine 400 assigns a unique volumetric profile to the object, person or animal. In block 412, routine 400 adds metadata from the object, person or animal to the unique volumetric profile. The unique volumetric profile contains metadata about the object, person or animal such as pixel colors obtained from video cameras, sounds obtained from microphones, position in the queue, time and height variation at each position (gait), relative or absolute temperature, line of sight, acceleration, and others.

In block 414, routine 400 stores the unique volumetric profile in a database. In block 416, routine 400 retrieves the unique volumetric profile from the database. Storage and retrieval of the unique volumetric profile may be used, for example, to compare the unique volumetric profile with a new object, person or animal detected in the reference signal feed. In "DONE" block 418, routine 400 ends.

Figure 5:
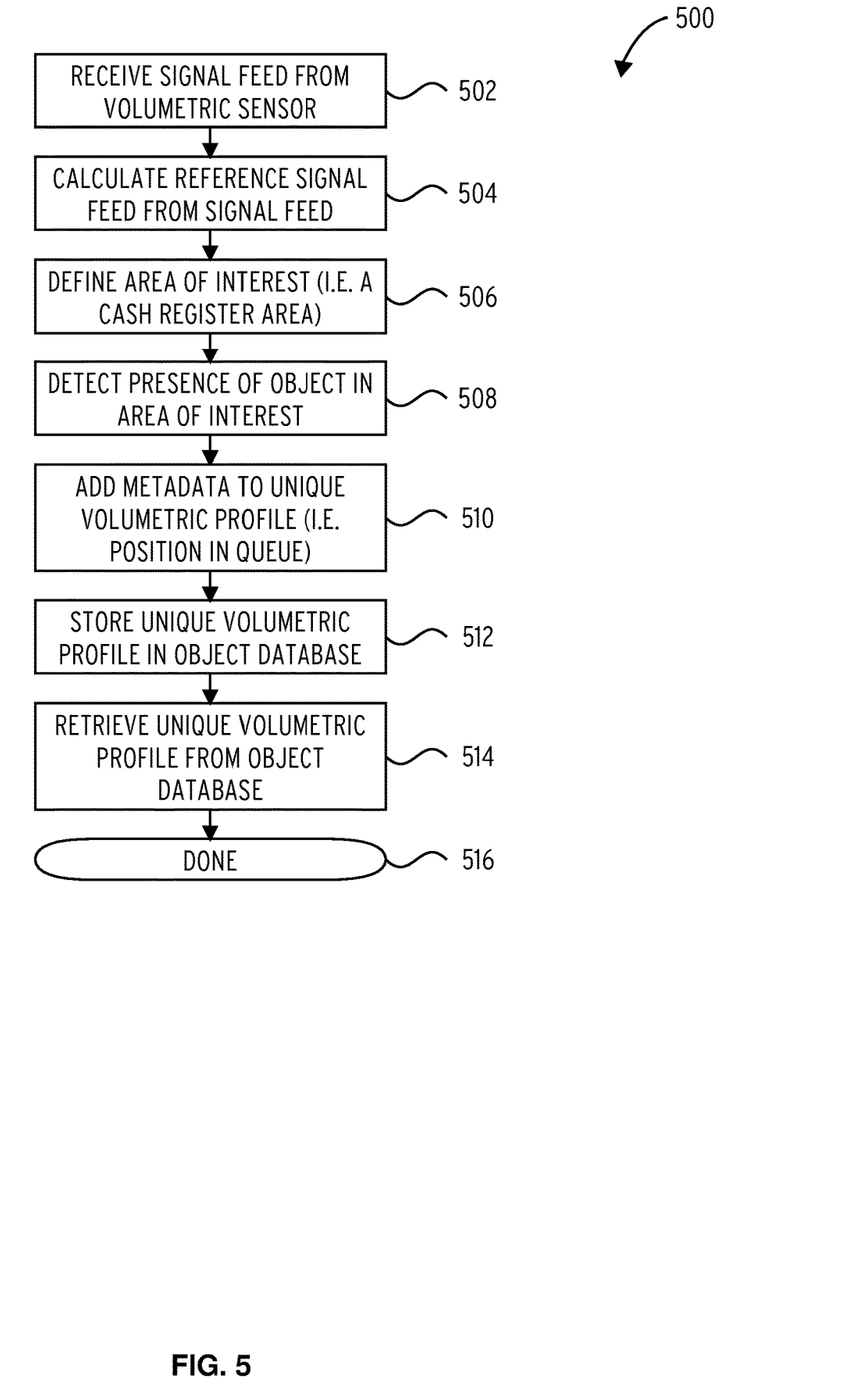
FIG. 5 illustrates a routine for tracking an area of interest in a reference signal feed in accordance with one embodiment.

FIG. 5 shows an example embodiment of a region of interest tracking system. Such an embodiment is useful, for example, to determine how much time customers spend in a region of interest or to detect when a customer engages with a watched object (i.e. determining whether the customer picked up an object).

In block 502, routine 500 receives a signal feed from a volumetric sensor, such as a thermal sensor or a depth sensor.

In block 504, routine 500 calculates a reference signal feed from the signal feed. As in FIG. 4, the reference signal feed is obtained by detecting non-movable objects in the signal feed. Other filters may also be applied, such as ignoring all objects outside (above or below) of a height or temperature threshold.

In block 506, routine 500 defines a 3D area of interest. A 3D region of interest is any area, such as a product display or a cash register, where the behavior of a moving object, person or animal is measured. In one embodiment, the 3D region of interest may be useful, for example, to detect how much time a customer is engaged with a customer representative. Another embodiment may be used to determine whether a customer picked up an object contained in the 3D area of interest.

In block 508, routine 500 detects the presence of an object, person or animal in the signal feed. When an object, person or animal is detected, the routine 500 detects the its contour and calculates the volumetric representation from said contour. In block 510, routine 500 generated a unique volumetric profile and adds metadata from the object to said unique volumetric profile. The unique volumetric profile contains metadata about the object such as time spent in the 3D region of interest or how many objects the customer has picked up, among others.

In block 512, routine 500 stores the unique volumetric profile in a database. In block 514, routine 500 retrieves the unique volumetric profile from the database. This may be needed, for example, to compare the unique volumetric profile with a new object, person or animal detected in the reference signal feed. In done block 516, routine 500 ends.

Figure 6:
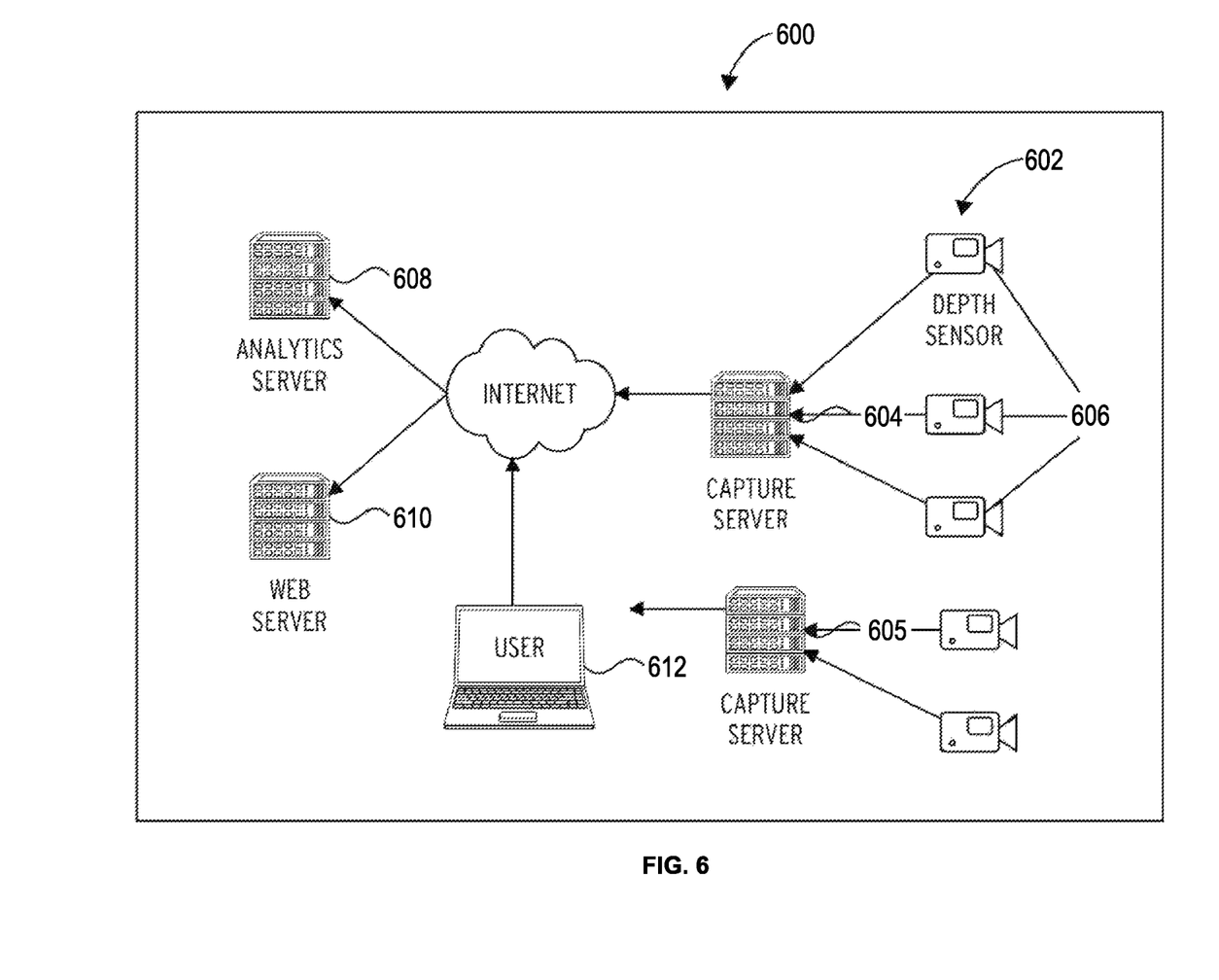
FIG. 6 illustrates an exemplary infrastructure for the person tracking system.

According to FIG. 6, tracking system 600 includes a capture server 604 operationally connected to a plurality of sensors 606 in a physical site. The plurality of sensors 606 includes at least one depth sensor 602. The plurality of sensors 606 may include any suitable type of sensor such as a video camera, a microphone, or other sensors. The data captured by the capture server 604 is filtered and processed to obtain a volumetric representation of a moving object, person or animal captured by the plurality of sensors 606. These volumetric representations are further processed to obtain a unique volumetric ID and a unique volumetric profile for each moving object, person or animal. The unique volumetric profile may include metadata such as the unique volumetric centroid and the unique volumetric position of the moving object, person or animal. The capture server may share its database with other associated capture servers 605.

After processing the captured data, the capture server 604 generates and sends data packet to the analytics server 608. As discussed, said data packet contains metadata information about the moving persons captured by the plurality of sensors 606. Communication between the capture server 604 and the analytics server 608 may be initiated in any suitable fashion such as a remote procedure call or an API. In some embodiments, the communication is performed in JSON, YAML, XML, or any similar format. In some embodiments, communication is performed by way of database or storage replication.

The analytics server 608 further processes the data from the capture server 604. For instance, the analytics server 608 may aggregate data from a plurality of capture servers.

According to some embodiments, the analytics server 608 applies techniques to determine aggregated information from a plurality of physical sites or regions of interest. After analytics server 608 processes the data, it places the result in a format suitable for display in a web server 610. The web server 610 provides access to a user 612 to the processed data in analytics server 608. In some embodiments, the analytics server may send notifications via email or an API call with the results based on user configured parameters.

The capture server 604, analytics server 608 and web server 610 each include at least one processor, RAM memory, a storage, and a connection to the Internet.

Figure 7:
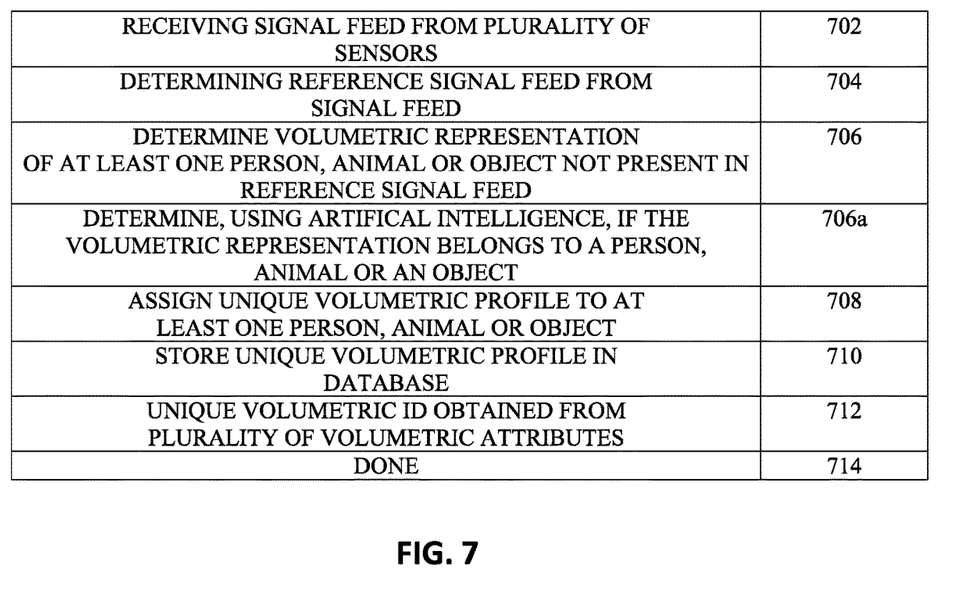
FIG. 7 illustrates a routine in accordance with one embodiment.

FIG. 7 shows the routine followed by capture servers 604 and 605 shown in FIG. 6. In block 702, routine 700 receiving a signal feed from a plurality of sensors. The plurality of sensors includes at least one depth sensor 602. Other types of sensors, such as thermal sensors and video cameras, may be suitable for obtaining and annotating volumetric representations of an object, person or animal. In block 704, routine 700 determining a reference signal feed from the signal feed. The reference signal feed is obtained by detecting non-movable objects in the signal feed. Other filters may also be applied, such as ignoring all objects outside (above or below) of a height or temperature threshold. This may be useful, for example, to ignore objects such as plants, crowd control devices, lamps, and other undesired objects. In block 706, routine 700 determines a volumetric representation and detects at least one person, animal, or object not present in the reference signal feed. When the person, animal or object is detected, the contour of said person, animal or object is obtained. In block 706a, using a CNN, the system may determine is said contour is that of a person, an animal or an object. In block 708, routine 700 assigns a unique volumetric profile to the at least one person. The unique volumetric profile contains all metadata obtained from the object, person or animal. In one embodiment, the unique volumetric profile contains metadata from a plurality of sensors, such as video cameras, thermal sensors, microphones, and others. In some embodiments, said metadata contains color, height, temperature, acceleration, line of sight, and others. In block 710, routine 700 stores the unique volumetric profile in a database. The person database may be any kind of suitable storage such as a structured database, a column-based database or a text file in a format such as JSON or YAML. This may be needed, for example, to compare the unique volumetric profile with a new object, person or animal detected in the reference signal feed. In block 712, routine 700 obtains a unique volumetric ID from a plurality of volumetric attributes. Assigning a unique volumetric ID may be performed by finding unique features of an object, person or animal based on the person's metadata and additional indirect calculations, such as its total volume, height, position, weight, color, acceleration, line of sight, and others. In one embodiment, these unique features are simply based on the location of the object, person or animal. In other embodiments, statistical and machine learning techniques may be used to train the system and later identify a volumetric representation once it reappears on screen after leaving the reference signal feed. In "DONE" block 714, routine 700 ends.

Figure 8:
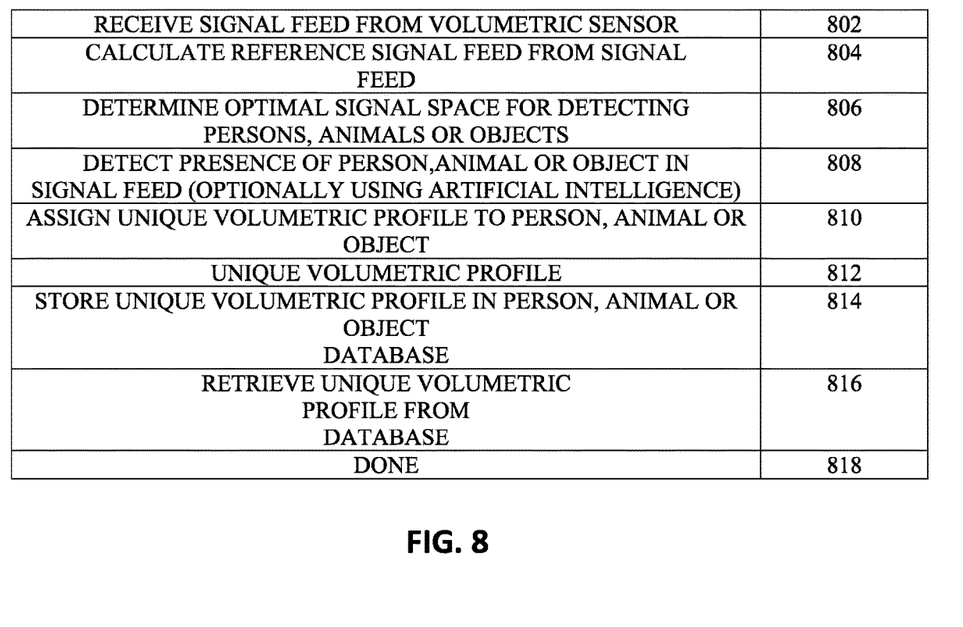
FIG. 8 illustrates a routine in accordance with one embodiment.

FIG. 8 shows an example embodiment of a person tracking system carrying out the routine followed by the analytics server 608 shown in FIG. 6. Such an embodiment is useful, for example, for determining if the same object, person or animal has been in an area without knowing their identity.

In block 802, routine 800 receives a signal feed from a volumetric sensor. In block 804, routine 800 calculates a reference signal feed from the signal feed. In block 806, routine 800 determines an optimal signal space for detecting objects, animals, or people. In block 808, routine 800 detects the presence of a person, animal, or object in the signal feed using pre-trained or custom CNN. In block 810, routine 800 assigns a unique volumetric profile to the person, animal, or object. In block 812, routine 800 adds metadata from the object, person or animal to the unique volumetric profile, such as color, sounds, height, temperature, acceleration, line of sight, and others. In block 814, routine 800 stores the unique volumetric profile in a database. In block 816, routine 800 retrieves the unique volumetric profile from the database. Storage and retrieval of the unique volumetric profile may be used, for example, to compare the unique volumetric profile with other unique volumetric profiles detected in different reference signal feeds. This comparison may be used to determine if an object, person or animal has been in signal feed (i.e. a place or sequence of places), without knowing its identity. In "DONE" block 818, routine 800 ends.

Another exemplary embodiment of the present invention comprises a shelf, such as a supermarket shelf, tracked by a plurality of sensors, including at least one depth sensor. In one embodiment, the signal feed comprises a plurality of polygonal regions of interest (PROI).

Each PROI represents a position in the shelf for a specific product. Usually there is a price indicator under every one of the spaces where a product is located on the shelf. The plurality of sensors tracks the presence of objects (products) in every PROI by determining the depth of each PROI. The information captured by the sensors is then sent to a capture server, following a process similar to the one carried out by the elements in FIG. 6.

The tracking system allows managers to measure, for example, the amount of stock left for a product, the impact of a special sale price, losses in stock due to theft, times when stock is depleted quicker, and other metrics. A further example would be determining, by analyzing the sales of a product in a specific aisle, the behavior of customers in order to optimize the placement of specific products throughout the store.

The plurality of sensors may be mounted on the opposing shelf in order to have visibility of the complete shelf. However, it will be apparent to a person skilled in the art that the sensors may be wall-mounted, attached to furniture, or installed in other ways.

Figure 9:
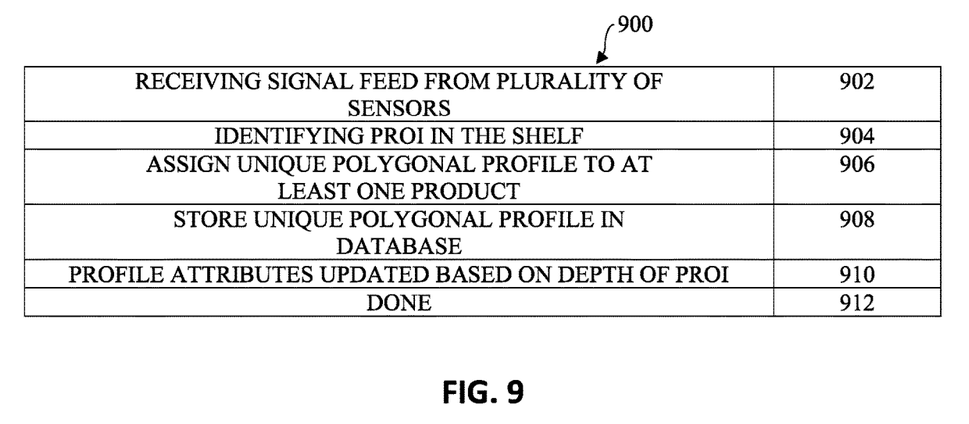
FIG. 9 illustrates a routine in accordance with one embodiment.

FIG. 9 shows the routine followed by capture servers 604 and 605 shown in FIG. 6. In block 902, routine 900 receives a signal feed from a plurality of sensors. The plurality of sensors includes at least one depth sensor 602. Other types of sensors, such as thermal sensors and video cameras, may be suitable for obtaining and annotating other me information related to the PROI. In block 904, routine 900 identifies all the PROI in the shelf. Other filters may also be applied, such as ignoring all objects of a certain color, such as price tags. In block 906, every PROI is assigned a unique PROI profile, which contains all metadata related to the product in said PROI. In one embodiment, the unique PROI profile contains metadata from a plurality of sensors, such as video cameras, thermal sensors, and product data such as inventory, name, price, etc. In block 908, every PROI profile is then stored in a database. The PROI database may be any kind of suitable storage such as a structured database, a column-based database or a text file in a format such as JSON or YAML. This may be needed, for example, to keep track of the amount of stock available for each product and determine when restocking is necessary. In block 910, the attributes for each PROI profile are updated. This may be accomplished by determining when the depth of a PROI has changed. Every time the depth increases, stock is being depleted. A computer software platform may be used to provide notifications to a user regarding a products stock based on said stock information. The software platform may also identify products with a warning color indicating the stock status for each one. For example, low stock products may be identified with red, so a user of the software platform knows a restock is necessary as soon as possible. In other embodiments, statistical and machine learning techniques may be used to train the system and later predict consumer behavior in order to obtain the proper amount of inventory or provide a special sale price for a product. Further analysis to improve the functioning of a store may be done with the PROI data, such as average times for restocking, peak customer hours, which products require a special sale price, etc. In "DONE" block 912, routine 900 ends.

The disclosure is not limited to the precise configuration described above. While the disclosure has been described as having a preferred design, it is understood that many changes, modifications, variations and other uses and applications of the subject invention will, however, become apparent to those skilled in the art without materially departing from the novel teachings and advantages of this disclosure after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures. In addition, many modifications may be made without departing from the essential teachings of the invention.

The invention claimed is:

1. A method comprising the steps of:
  receiving, by a capture server, a signal feed from a plurality of sensors, said signal feed comprising at least one polygonal region of interest, said plurality of sensors comprising at least one depth sensor,
  determining the depth of said at least one polygonal region of interest,
  assigning a unique profile to said at least one polygonal region of interest, wherein said profile comprises a plurality of product attributes comprising at least a stock amount;
  storing said unique profile in a database,
  updating said plurality of product attributes based on said depth of said at least one polygonal region of interest.

2. The method of claim 1, further comprising processing an aggregated data based on a plurality of unique profiles stored in the database.

3. The method of claim 2, wherein the aggregated data comprises a number of products on a store shelf.

4. The method of claim 2, further comprising the step of comparing said unique profile with a plurality of unique profiles stored in said database.

5. The method of claim 1, wherein the plurality of product attributes further comprises one or more of a total inventory, store location, and average stock depletion time.

6. The method of claim 1, wherein the plurality of sensors further comprises at least one video sensor and the plurality of product attributes further comprises color.

7. The method of claim 1, wherein the plurality of sensors further comprises at least one thermal sensor and the plurality of product attributes further comprise temperature.

8. The method of claim 1, further comprising the step of sending alerts via email or API calls based on user defined parameters.

9. The method of claim 1, further comprising the step of providing visual indicators of said plurality of product attributes through a software platform based on user defined parameters.

10. A computing apparatus, the computing apparatus comprising:
  a processor; and
  a memory storing instructions that, when executed by the processor, configure the apparatus to a processor execute the steps of:
  receiving, by a capture server, a signal feed from a plurality of sensors, said signal feed comprising at least one polygonal region of interest, said plurality of sensors comprising at least one depth sensor,
  determining the depth of said at least one polygonal region of interest,
  assigning a unique profile to said at least one polygonal region of interest, wherein said profile comprises a plurality of product attributes comprising at least a stock amount;
  storing said unique profile in a database,
  updating said plurality of product attributes based on said depth of said at least one polygonal region of interest.

11. The computing apparatus of claim 10, wherein the plurality of product attributes further comprises one or more of a total inventory, store location, and average stock depletion time.

12. The computing apparatus of claim 10, wherein the plurality of sensors further comprises at least one video sensor and the plurality of product attributes further comprises color.

13. The computing apparatus of claim 10, wherein the plurality of sensors further comprises at least one thermal sensor and the plurality of product attributes further comprises temperature.

14. The computing apparatus of claim 10, wherein the processor is further configured to execute the step of comparing said unique profile with a plurality of unique profiles stored in said database.

15. The computing apparatus of claim 10, wherein the processor is further configured to send alerts via email or API calls based on user defined parameters.

16. The computing apparatus of claim 10, wherein the processor is further configured to provide visual indicators of said plurality of product attributes through a software platform based on user defined parameters.

17. A non-transitory computer-readable storage medium, the computer-readable storage medium including instructions that when executed by a computer, cause the computer to a processor execute the steps of:
  receiving, by a capture server, a signal feed from a plurality of sensors, said signal feed comprising at least one polygonal region of interest, said plurality of sensors comprising at least one depth sensor,
  determining the depth of said at least one polygonal region of interest,
  assigning a unique profile to said at least one polygonal region of interest, wherein said profile comprises a plurality of product attributes comprising at least a stock amount;
  storing said unique profile in a database, updating said plurality of product attributes based on said depth of said at least one polygonal region of interest.

18. The non-transitory computer-readable storage medium of claim 17, wherein the plurality of product attributes comprises one or more of a total inventory, store location, and average stock depletion time.

19. The non-transitory computer-readable storage medium of claim 17, further comprising the step of providing visual indicators of said plurality of product attributes through a software platform based on user defined parameters.

20. The non-transitory computer-readable storage medium of claim 17, further comprising the step of sending alerts via email or API calls based on user defined parameters.

* * * * *